United States Patent [19]

Sterki et al.

[11] 4,276,699

[45] Jul. 7, 1981

[54] METHOD AND TEST APPARATUS FOR TESTING THE TOOTH FLANK PROFILE OF LARGE DIAMETER GEARS

[75] Inventors: Armin Sterki, Uetikon; Gerd R. Sommer, Dietikon; Walter Naegeli, Oberengstringen, all of Switzerland

[73] Assignee: Maag Gear Wheel & Machine Co. Ltd., Zürich, Switzerland

[21] Appl. No.: 147,041

[22] Filed: May 5, 1980

[30] Foreign Application Priority Data

May 14, 1979 [CH] Switzerland .......................... 4452/79

[51] Int. Cl.³ ............................. G01B 5/20; G01B 7/28
[52] U.S. Cl. ............................ 33/179.5 R; 33/179.5 D
[58] Field of Search ..................... 33/179.5 R, 179.5 D

[56] References Cited

U.S. PATENT DOCUMENTS

| 2,657,469 | 11/1953 | Brown | 33/179.5 E |
| 3,522,524 | 8/1970 | Smith et al. | 33/179.5 R |
| 3,800,423 | 4/1974 | Munro et al. | 33/179.5 R |
| 3,950,858 | 4/1976 | Donner et al. | 33/179.5 R |

FOREIGN PATENT DOCUMENTS

| 1423570 | 1/1969 | Fed. Rep. of Germany | 33/179.5 R |
| 597296 | 1/1948 | United Kingdom | 33/179.5 R |
| 691734 | 5/1953 | United Kingdom | 33/179.5 R |
| 844762 | 8/1960 | United Kingdom | 33/179.5 R |
| 894714 | 4/1962 | United Kingdom | 33/179.5 R |

OTHER PUBLICATIONS

Publication entitled "Jenaer Rundschau" (1971, Band 16, Nr. 2, entitled Dei Verzahnungsmesstechnik im Wandel der Zeiten, by E. Hultzsch, p. 114, columns 2 to 3 and FIG. 15.

*Primary Examiner*—Willis Little
*Attorney, Agent, or Firm*—Werner W. Kleeman

[57] ABSTRACT

A method and test apparatus for testing the tooth flank profiles of large diameter gears, contemplates the provision of two contact elements and a measuring feeler, which is movable along a X-axis parallel to the connection line of both contact elements and a Y-axis extending transversely thereto. The contact elements are inserted into a respective tooth gap or space of a gear which is to be measured and the test apparatus is brought into a position where both of the axes are located in a plane normal to the gear axis. Then, there is determined the origin of a X-Y-coordinate system formed by both axis, the measuring feeler thereafter is moved along at least one tooth flank and the thus measured coordinates are compared with reference values. Importantly, the invention contemplates measuring the spacing between both of the contact elements and determining therefrom the spacing of the coordinate origin from the gear axis.

11 Claims, 12 Drawing Figures

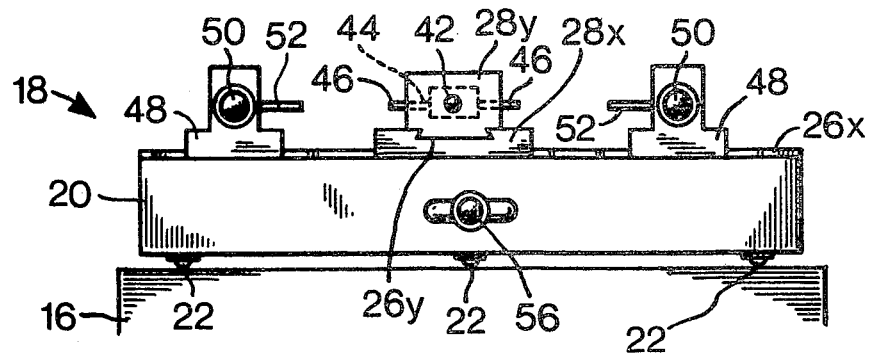
Fig.2
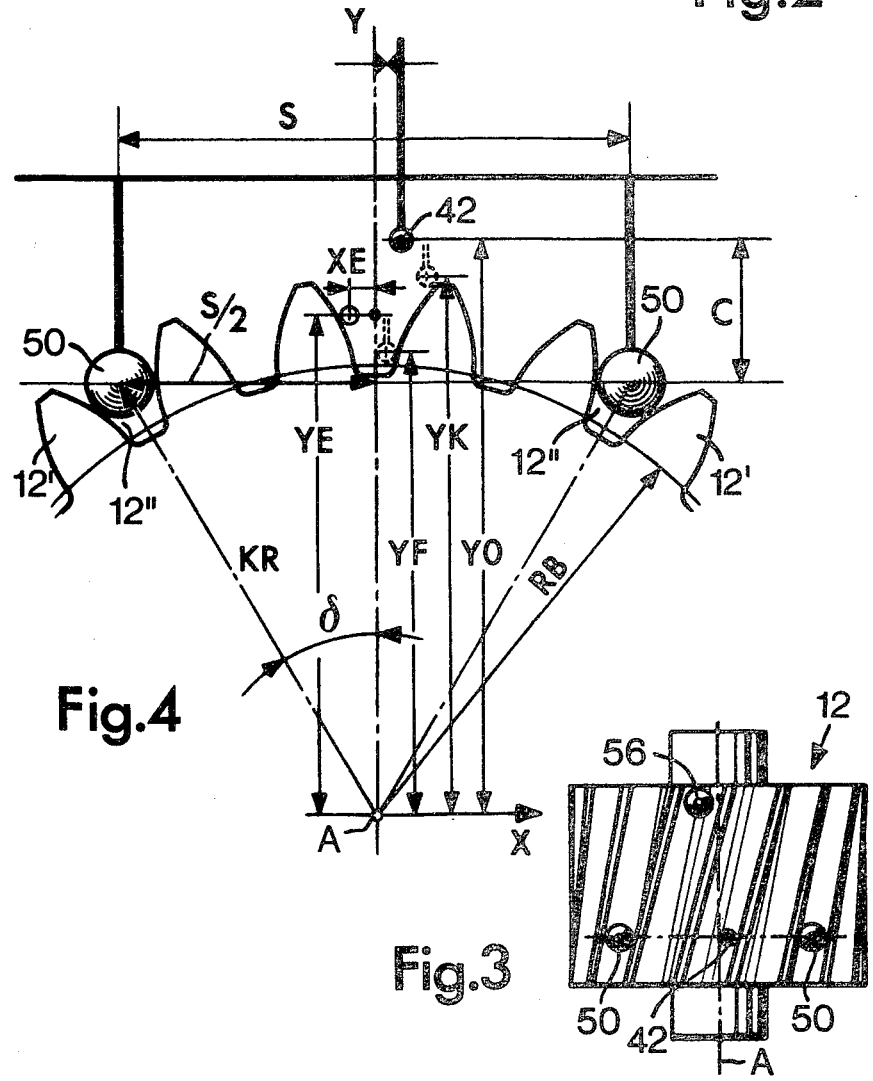
Fig.4
Fig.3

METHOD AND TEST APPARATUS FOR TESTING THE TOOTH FLANK PROFILE OF LARGE DIAMETER GEARS

CROSS-REFERENCE TO RELATED CASE

This application is related to our commonly assigned, copending U.S. application Ser. No. 111,769, filed Jan. 14, 1980, entitled "Gear Testing Machine".

BACKGROUND OF THE INVENTION

The present invention relates to a new and improved method of, and testing apparatus for, testing the tooth flank profile of large diameter gears.

Generally speaking, the method for testing the tooth flank profiles of gears of large diameter, comprises the utilization of a testing apparatus having two contact or support elements and a measuring feeler. The measuring feeler is movable along a X-axis which is parallel to the line connecting both of the contact elements and along a Y-axis extending transverse to the X-axis. The contact elements can be placed into respective tooth gaps or spaces of a gear which is to be measured. The testing apparatus or machine is placed into a position where both axes are located in a plane which is normal to the gear axis, so that there is determined the origin or null point of a X-Y-coordinate system formed by both axes. Thereafter, the measuring feeler is moved along at least one of the tooth flanks and the thereby measured coordinates are compared with reference values.

The testing machine or apparatus of the invention, useful for performance of such method, comprises two contact slides or carriages, which can be displaced in relation to one another along a guide means extending tangentially with respect to the gear and each contact slide supports a respective contact element suitable for engagement into a tooth space or gap. Further, there is provided a cross-slide arrangement, which supports a measuring feeler or probe and comprises a X-slide or carriage, displaceable along a X-guide arrangement likewise extending tangentially with respect to the gear, and a Y-slide which is displaceable along a Y-guide arrangement or guide extending radially with respect to the gear.

In the context of this disclosure, under the expression "large diameter gears" or equivalent terminology, there is meant, in the first instance, straight and helical-toothed spur gears beginning with about 300 millimeters diameter, which because of their size cannot, or at best only with great difficulty, perform generating movements with the requisite accuracy for testing their tooth flank shape or profile, especially their more or less exact involute-shaped tooth profile.

For quite some time there exists the need of testing the shape of tooth flanks of such gears, in a simple manner with a movable test machine, either directly at a tooth flankcutting or production machine or at the site of employment of the geras. Thus, from the publication "Werkstatt und Betrieb" 1960, Vol. 5, pages 247-248, there is disclosed a method of the described type wherein there are engaged or received an uneven number of teeth between two spherical contact or support elements which can be placed into a respective tooth space or gap of a gear which is to be checked or tested. Prior to the start of the actual testing operation, the measuring feeler or probe, which likewise possesses a spherical feeler head, is centrally adjusted or set in relation to both of the contact elements such that the center of the feeler head coincides with the center line of the tooth which is to be tested. In this position there is set to null a measuring screw provided for shifting the measuring feeler along the Y-axis. After this reference setting the measuring feeler is brought into one of both neighboring tooth spaces or gaps and adjusted in the direction of the tooth base through a value corresponding to a computated elevation value at an appropriate point of the tooth flank near to the pitch circle. Then, the measuring feeler is displaced, by means of a further measuring screw in the direction of the X-axis, to such an extent until the measuring head contacts the tooth flank at the predetermined elevation or height and a dial gauge, indicating the deflections or movements of the measuring feeler, reaches its null position. Now also the measuring screw, provided for the movements along the X-axis, is set to null. From this starting position the measuring feeler is successively set to a number of likewise previously selected or computated Y-values, and following each setting along the X-axis is displaced along the tooth flank until the dial gauge indicates a null reading. A comparison of the magnitudes, through which the measuring feeler has been displaced along the X-axis, with computated X-axis values, enables recognition of possible errors in the tooth profile.

This heretofore known testing method leads to unsatisfactory results if the gear to be tested, as is conventional practice at the present time, is not or only inaccurately ground at its tooth tip surface. In this case, it is not possible by scanning a tooth tip or addendum, to obtain a sufficiently exact reference point.

SUMMARY OF THE INVENTION

It is a primary object of the present invention to improve upon the heretofore known method and testing apparatus in a manner such that, the tooth flank shape of gears of large diameter, also those having a tooth tip surface which has not been machined or inaccurately machined, can be simply and accurately measured, and it is immaterial whether such gear is chucked at a tooth flank-machining or production machine, reposes upon a test table or, in fact, is assembled into a gearing or drive arrangement.

Now in order to implement these and still further objects of the invention, which will become more readily apparent as the description proceeds, the method aspects of the present development are manifested by the features that there is measured the distance or spacing S between both of the contact elements and from such spacing there is derived the spacing or distance YO of the coordinate origin from the gear axis according to the equation:

$$YO = \frac{S}{2} \cdot ctg\left(180° \cdot \frac{KZ}{Z}\right) + C$$

wherein:

C designates a constant of the testing machine or apparatus,

KZ designates the number of teeth between both of the contact elements, and

Z designates the total number of teeth of the gear.

It is readily possible to bring the testing apparatus of the described species into a position where the X-axis and the Y-axis are located in a plane which is normal or perpendicular to the gear axis. To this end there are provided devices which can come to bear, by means of three legs, upon an end surface of the gear to be tested, and with the aid of three further legs, of which at least one is structured as a feeler or scanner, come to bear upon a planar or flat surface of a testing machine. The equipment indicates the direction in which the testing machine must be displaced, so that the aforementioned flat or planar surface, and thus, a X-Y-coordinate system of the testing machine which is parallel thereto, assumes a position parallel to the end surface of the gear. Provided that the gear axis extends perpendicular to this end surface, it then also extends at right angles to the aforementioned coordinate system.

The inventive method can be carried out independent of the size of the gear and the number of teeth which are received between the contact elements, both in a simple manner and without any movement of the gear. The user therefore has the option of receiving between the contact or support elements either an even or an uneven number of teeth. As a rule, there are selected the largest number of teeth, with which the usually spherical-shaped contact elements positively bear against a respective two neighboring tooth flanks without one of these teeth flanks abutting against a shaft or the like upon which there is formed or attached the related contact or support element. In any event, the measuring operation can be carried out with a relatively simple measuring feeler or probe, which only need be deflected along the X-axis and does not require any particular protection against overloading in the direction of the Y-axis, since the tooth tip surfaces or the tooth base surfaces, with the inventive testing apparatus, need not be scanned.

According to a preferred mode of carrying out the inventive method, the measuring feeler itself, together with the therewith operatively related measuring and control devices, is used for measuring the spacing of both contact elements in that the measuring feeler is brought into a reference position determined by the position of the one contact element, at that location activates a X-scanner or feeler which scans the movement of the measuring feeler along the X-axis, so that the measuring feeler is brought into a reference position, governed by the position of the second contact element, and at that location there is determined the distance through which the X-scanner has moved.

If, as with the described heretofore known method, there are received between both of the contact or support elements, an uneven number of teeth, then the measuring feeler, according to the invention, can be applied, from a retracted position which it assumes during measurement of the spacing or distance S between both of the contact or support elements, directly at one of the tooth flanks of the intermediate tooth between both of the contact elements, whereupon there is determined the related X-and-Y-values. The measuring feeler then is moved about the intermediate tooth and applied at its other tooth flank at a location having the same Y-value, the mean or average value between both of the X-values is formed and there is correspondingly corrected the position of the Y-axis. In so doing, there is used the initial measurement of the spacing between the contact elements only for the computation of the value YO, and thus, for the computation of that curve along which moves the center of the measuring feeler when the measuring feeler scans a faultless tooth flank profile. Pitch errors, which can be incorporated into the measurement of the spacing between both of the contact elements, are extensively compensated as to the effect that they might have upon the measurement of the tooth flank profile in that, there is taken into account the actual thickness of the tooth to be tested in accordance with the distance through which the X-scanner has moved as previously explained.

The corresponding holds true if, in contrast to the described heretofore known method, there is received between both of the contact elements an even number of teeth. In this case, the measuring feeler is applied, from its retracted position which it assumes during measurement of the spacing S between both of the contact elements, directly at one of the tooth flanks to both sides of the intermediate tooth gap between both of the contact elements, there are determined the related X-and-Y-coordinates, then the measuring feeler, without changing its Y-value is applied to the other tooth flank which bounds the intermediate tooth gap or space, there is formed the mean or average value between both of the X-values, and there is correspondingly corrected the position of the Y-axis.

As already explained above, the apparatus also relates to a new and improved construction of testing apparatus or machine of the previously mentioned type which is manifested by the features that, the X-guide or guide arrangement extends over the entire path through which there has moved the X-slide, so that during each adjustable spacing of both of the contact slides or carriages from one another, the measuring feeler can scan in succession the positions of both of the contact slides. With the described state-of-the-art testing apparatus the X-guide of the cross-slide arrangement supporting the measuring feeler is so short that the measuring feeler cannot scan or feel the position of both contact slides; One of both contact slides, which with the heretofore known testig machine determines the X-axis, is not accessible to the measuring feeler also because of a projection or protuberance of the X-guide.

While with the described prior art testing machine the guide for the displacement of the one contact slide in relation to the other contact slide which determines the X-axis, is separately constructed from the X-guide for the measuring feeler and arranged in spaced relationship therefrom, according to a preferred further development of the inventive testing apparatus it is contemplated that both of the contact slides, and between them the X-slide, are guided to be displaceable upon a common X-guide or guide arrangement.

The preferred method described above can be carried out with the inventive testing apparatus or machine in the manner such that, the measuring feeler is successively directly brought into contact with both of the contact elements which determine the X-axis. However, these contact elements, in their position in a respective one of the tooth spaces or gaps of the gear to be checked, could be difficult to reach, particularly if as is conventional they possess a spherical-shaped configuration and are formed or attached to a respective relatively thin shaft. In this case, it is advantageous if each contact slide possesses at its side confronting the other contact slide, a stop or impact member, and the measuring feeler is connected with two feeler arms protruding therefrom in the X-direction towards both sides. The feeler arms, in a predetermined position of the Y-slide, can be brought into contact with both of the stops or impact members by displacing the X-slide. Upon displacement of the X-slide through a distance or path, which can be appreciably smaller than the distance between both of the contact elements, it is possible, by virtue of the feeler arms and the related stops, to obtain measuring points whose spacing need only be multiplied by a machine constant, in order to arrive at the spacing of the contact elements.

As a prerequisite for automation of all of the measuring operations, it is furthermore advantageous if there is arranged at the X-guide and the Y-guide a respective electronic scannable incremental scale and the X-slide as well as the Y-slide each support a related X-scanner and Y-scanner, respectively, which is connectable with an electronic counter.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 2 is a schematic side view of the feeler unit of the arrangement of FIG. 1 viewed from the gear.

FIG. 3 illustrates the principle of coaction of the feeler unit or device with another gear;

FIG. 4 is a markedly simplified top plan view of parts of the feeler unit and the gear;

DETAILED DESCRIPTION OF THE PREFERRED EMBODIMENTS

Figure 1:
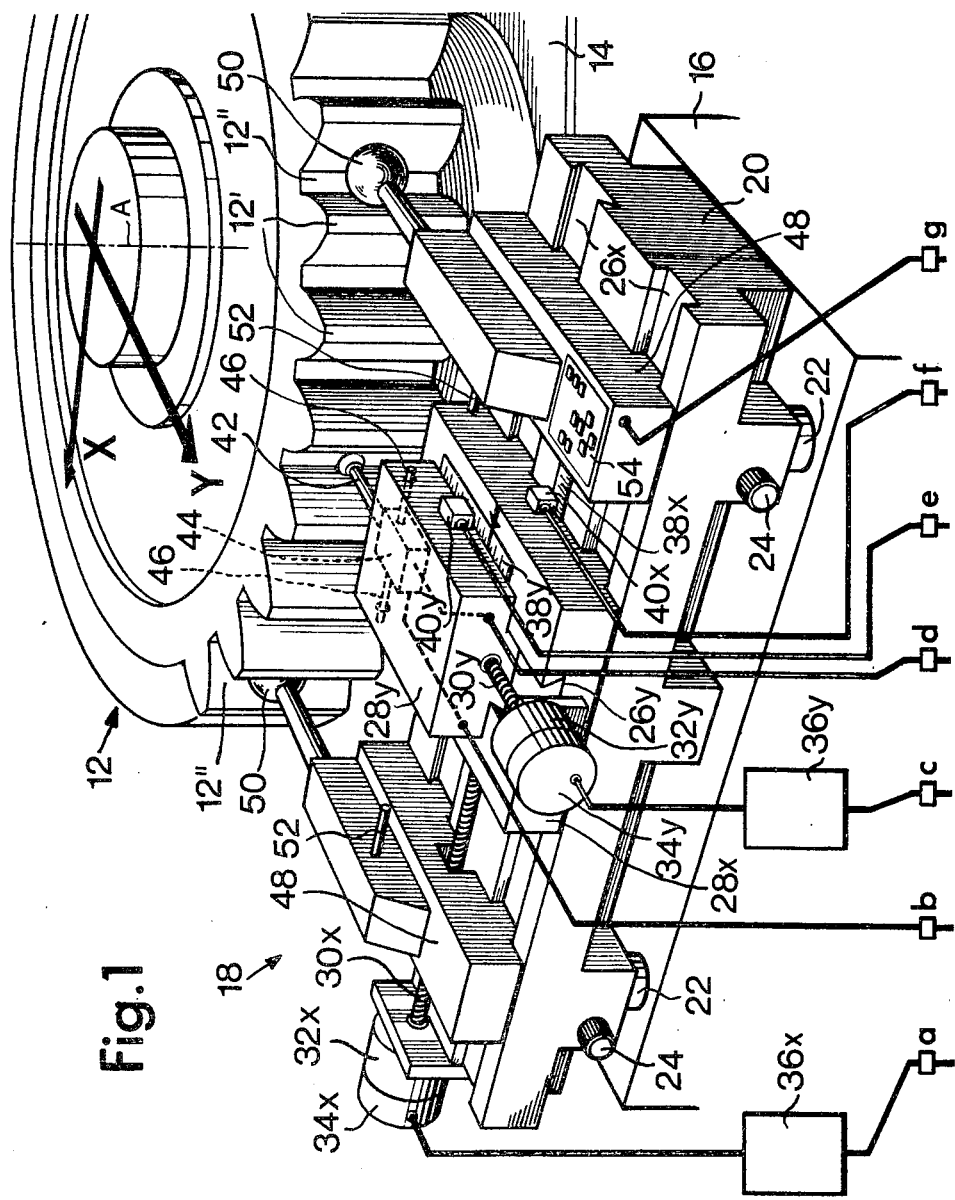
FIG. 1 is a schematic perspective view of a feeler unit or device of an inventive testing machine or apparatus during the measuring of a gear.

Describing now the drawings, in FIG. 1 there is shown part of a straight-toothed gear 12 of which only a few of the teeth 12' and teeth gaps or spaces 12" have been illustrated. The gear 12, at which there should be tested several of the tooth flanks, during the testing operation lies because of its weight, immovably upon a measuring plate 14 or the like. Adjacent the measuring plate 14 there is arranged an elevationally adjustable table 16, upon which there stands the mechanical part, designated in its entirety as the testing or feeler unit 18, of a testing machine or apparatus according to the invention.

The testing unit or device 18 comprises a bed 20 having three legs or feet 22, of which the two feet 22, visible in the showing of FIG. 1, can be elevationally adjusted by means of a related respective adjustment screw 24 or equivalent structure.

At the top surface of the bed 20 there is formed a guide or guide arrangement 26x, upon which there can be displaced a slide or carriage 28x by means of a threaded spindle 30x or equivalent structure. The threaded spindle 30x is axially non-displaceably mounted at the one left-hand end of the bed 20 of the arrangement of FIG. 1 and can be rotatably driven by means of a suitable drive, here shown as a servomotor 32x. This servomotor 32x is connected along with a therewith related tachogenerator 34x at a regulator or regulator means 36x containing a standard servo-amplifier. Arranged along the guide or guide arrangement 26x is an incremental scale 38x which can be scanned by means of a scanner or feeler 40x arranged at the slide or carriage 28x, so that there is known at any point in time the position of the slide 28x in relation to a selectable null point.

Extending at right angles to the guide or guide means 26x is a guide or guide means 26y which is formed at the slide or carriage 28x. Along the guide means 26y there is displaceable a slide or carriage 28y by means of a threaded spindle 30y or equivalent structure. The threaded spindle 30y is mounted to be axially non-displaceable at the one end of the slide 28x which confronts the observer of the showing of FIG. 1 and can be rotatably driven by means of a suitable drive here shown as the servomotor 32y. This servomotor 32y is connected in conjunction with a therewith related tachogenerator 34y at a regulator or regulator means 36y containing a conventional servo-amplifier. Extending along the guide or guide arrangement 26y is an incremental scale 38y which can be scanned by means of a scanner or feeler 40y arranged at the slide 28y.

The feet or legs 22 of the bed 20 can be set or adjusted such that the guides or guide means 26x and 26y both extend at right angles to the axis A of the gear 12. Due to the arrangement of the bed 20 there is defined a X-axis, parallel to the guide or guide means 26x, which intersects the gear axis A, and accordingly, also intersects at right angles a Y-axis which extends parallel to the guide means 26y. Because of this correlation between the X-axis and the Y-axis the guide means or guides 26x and 26y also will be referred to conveniently herein as the X-guide or guide means and the Y-guide or guide means, respectively, and in corresponding manner the slides 28x and 28y will be conveniently referred to as the X-slide and the Y-slide, respectively.

The Y-slide 28y carries a measuring feeler 42 which is mounted within a feeler housing 44 secured to this Y-slide 28y, in a manner such that its spherical-shaped free end can be moved to-and-fro in the direction of the X-axis. Hence, the possibility exists of selecting between two impact positions, namely in the left impact or contact position of FIGS. 1 and 4 where the measuring feeler 42 is pre-biased when it has to scan a right tooth flank, and a right impact or contact position, where the measuring feeler is pre-biased when it has to scan a left tooth flank. The path of the spherical-shaped end of the measuring feeler 42, between both of the impact or contact positions, is extremely small; within the feeler housing 44 there is arranged a conventional signal transmitter which renders discernable when the measuring feeler 42 has been displaced out of that impact position where it is pre-biased, into an intermediate position.

Measuring feeler 42 is connected with two feeler arms 46, which protrude towards both sides essentially parallel to the X-axis out of the feeler housing 44.

At both sides of the slide or carriage 28x there is guided at the guide or guide means 26x a respective contact slide or carriage 48. Both of the contact slides 48 do not have their own inherent drive means and can be displaced, against the friction produced by their weight, along the guide or guide means 26x, in other words in the direction of the X-axis. At each of both contact slides 48 there is attached a contact element 50. Both of these contact or support elements 50 are preferably, as illustrated, constructed as bolt members having substantially spherical-shaped free ends and fixedly exchangeably clamped at a respective related one of the contact slides 48. At both of the contact slides 48 there is additionally secured a respective bolt-shaped stop or impact member 52, which extends parallel to the X-axis in the direction of the cross-slide arrangement constituted by the slides 28x and 28y. The slide 28y can be brought into a position which is retracted from the gear 12, where its two feeler arms 46 are in alignment with the bolt-shaped stops 52 of the contact slides 48. This retracted or inset position can be defined, for instance, as the null position of the slide 28y.

Figure 8:
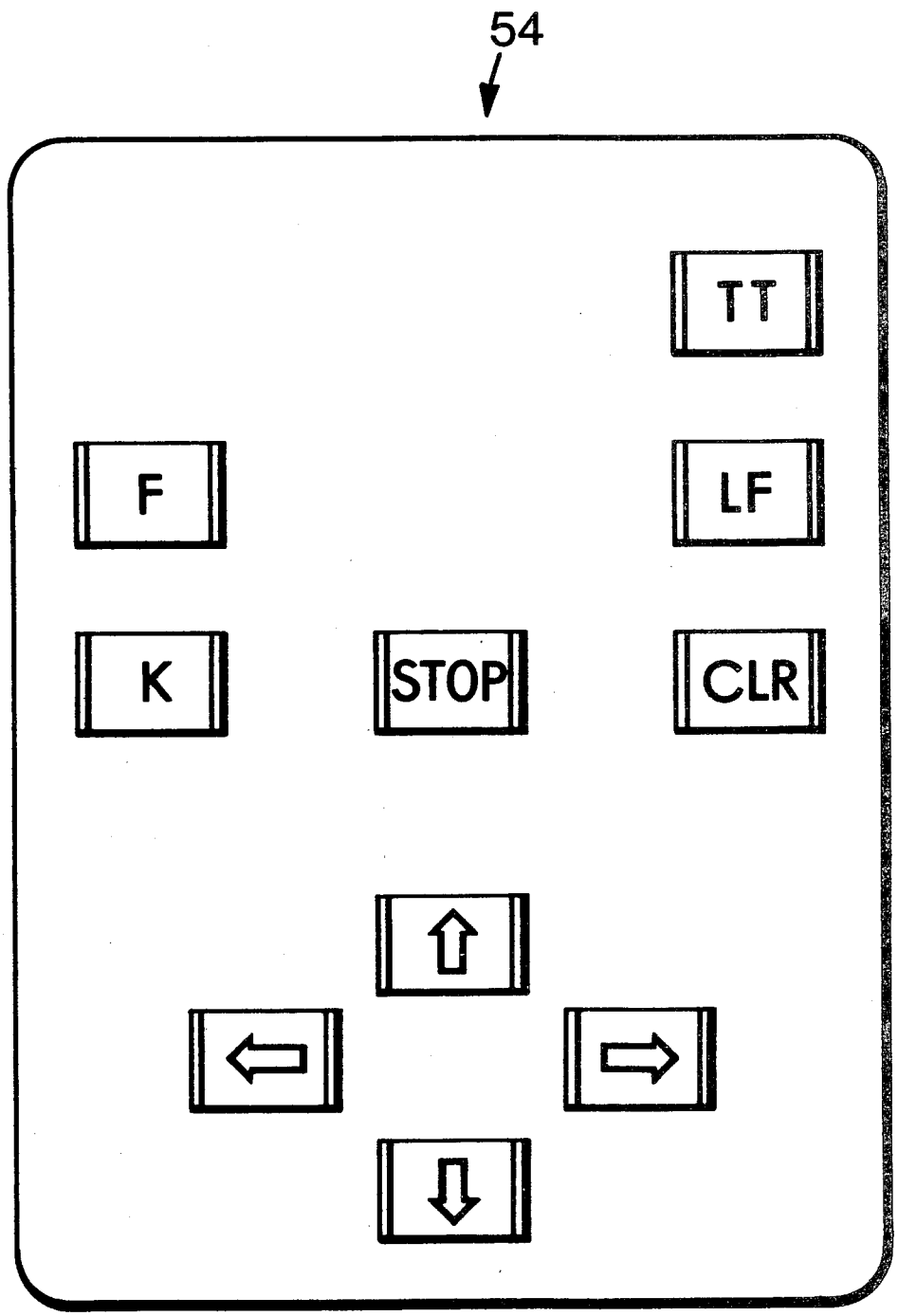
FIG. 8 is an enlarged top plan view of a keyboard used in the arrangement of FIG. 1.

The right-hand contact slide 48 of the showing of FIG. 1, possesses at its region facing away from the related contact element 50, and which region is easily accessible and visually inspectable by the user of the testing machine, a keyboard 54 or equivalent structure, details of which will be more readily apparent from the showing of FIG. 8 and as will be described more fully hereinafter.

The side of the feeler unit or device 18, facing away from the observer or viewer of the illustration of FIG. 1 and the side confronting the gear 12 illustrated in FIG. 2, possesses an auxiliary spherical bolt 56. This auxiliary spherical bolt 56 is displaceably guided parallel to the X-axis at the bed 20 and is provided, apart from the contact or support elements 50, as the third support of the feeler unit 18 for those situations where there should be tested or checked the tooth flank profile of a gear 12 having a horizontal axis A. In this case, the feeler unit or device 18, as a modification of the showing of FIGS. 1 and 2, is not placed upon the table 16, rather is placed in an upright position upon the gear 12 itself, and both of the contact elements 50 and the auxiliary spherical bolt 56 extend downwardly and engage with a respective tooth gap or space 12″ of the gear 12. In analogous manner as in the showing of FIG. 1, here the measuring feeler 42 is arranged at the connection line between both of the contact or support elements 50; the auxiliary spherical bolt 56 is offset with respect to such connection line in the direction of the gear axis A, so that there is formed a positive three-point support of the feeler unit or device 18, as will be apparent from the showing of FIG. 3.

The geometric prerequisites for the testing of the tooth flank profile have been shown in FIG. 4. As far as the gear 12 which is to be tested is concerned there is known, among other things the number of teeth or tooth number Z. The user of the equipment has arranged the testing machine such that both of the contact elements 50 engage into a respective tooth gap or space 12″ of the gear 12 and bear against the neighboring tooth flanks. Therefore, there is also known the number KZ of the teeth between both of the contact or support elements 50; according to FIG. 4 there are four such teeth of the gear 12 between both of the contact elements 50. What is furthermore known is the value or magnitude C, measured in the direction of the Y-axis, through which there has been inset or rearwardly positioned the center of the spherical-shaped head of the measuring feeler 42 behind the connection line between the centers of both of these spherical-shaped contact elements 50, when the Y-slide 28y assumes its basically freely selectable null position, for instance the aforementioned position where the feeler arms 46 are in alignment with the bolt-shaped stop or impact members 52.

What is unknown as far as the testing apparatus or machine is concerned, is the center of the gear 12; therefore there is also unknown the distance or path YO, through which the measuring feeler 42 is spaced from the center or the axis A of the gear 12, when the Y-slide 28y, as illustrated in FIG. 4 assumes its null position. Likewise unknown is the distance KR of the center of each of both contact or support elements 50 from the center or the axis A of the gear 12. With a given tooth number Z of the gear 12 and a selected number KZ of the teeth 12′ which have been received between the contact elements 50, it is possible to calculate the angle δ from the following equation:

$$\delta° = \frac{180°}{Z} \cdot KZ \quad (1)$$

As to the still unknown magnitude or value KR there is valid the following equation:

$$KR = \frac{S/2}{\sin \delta} \quad (2)$$

wherein: S represents, according to the showing of FIG. 4, the spacing of the center of both contact elements 50 from one another. Furthermore, from FIG. 4 there can be derived:

$$YO = KR \cdot \cos \delta + C \quad (3)$$

If equations (1) and (2) are substituted into equation (3), then there results:

$$YO = \frac{S}{2} \cdot \text{ctg}(180° \cdot \frac{KZ}{Z}) + C \quad (4)$$

The value YO can be determined therefore by a measurement of the distance or spacing S and predicated upon the known numerical values Z and KZ, and there results therefrom, for the testing machine or apparatus the position of the X-axis. The Y-axis extends through the center between the centers of both substantially spherical-shaped contact elements 50, provided that the gear 12 is free of tooth pitch errors. That this is so can be assumed for the orientation of the feeler unit or device 18 in relation to the gear 12. In order to orient the feeler unit 18 it is therefore sufficient to measure the distance S and to computate therefrom S/2 as well as YO.

Figure 5:
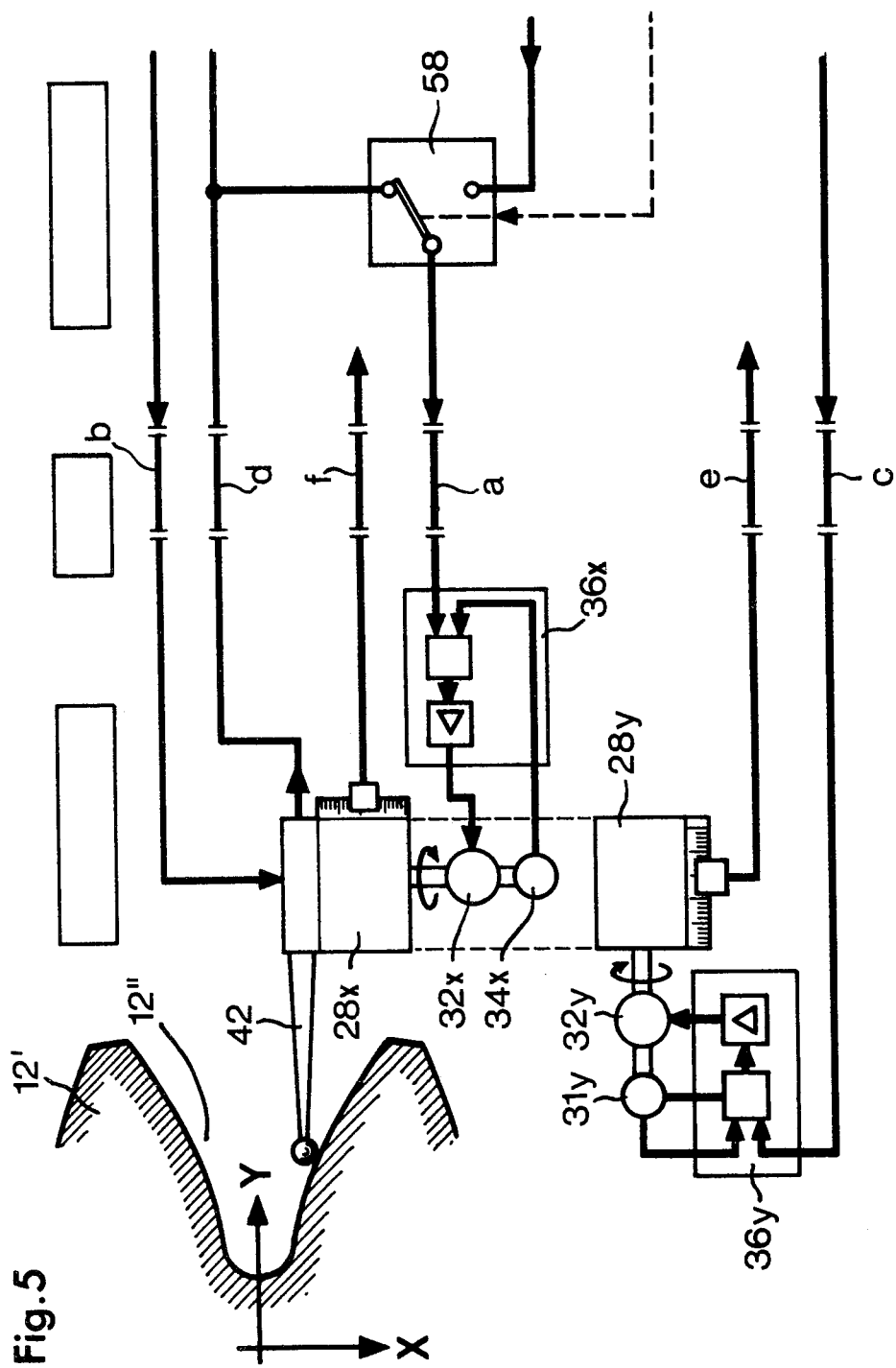
FIG. 5 is a further enlarged partial top plan view, in relation to the showing of FIG. 4 of the gear and the feeler unit and showing parts of the related electronic circuit.

Continuing, FIG. 5 portrays, in particular, the circuit arrangement of electrical or electronic components which have already been discussed during the description of the arrangement of FIG. 1. Analogous to the showing of FIG. 1, in FIG. 5 there have been illustrated the electrical lines or conductors a to f, which have the following significance.

Through the line a it is possible to infeed a X-reference value to the X-regulator and the servo-amplifier 36x; by means of the line f the X-scanner 40x reports the position-actual value of the X-slide 28x. By means of the line c it is possible to infeed to the Y-regulator and the servo-amplifier 36y a Y-reference value; by means of the line e the Y-scanner 40y reports the actual position of the Y-carriage 28y. By means of the line b it is possible to control the measuring feeler 42 and, as described, to selectively pre-bias towards the left or towards the right the same, so that it selectively can scan a right tooth flank or a left tooth flank. The measuring feeler 42 transmits feeler signals by means of a line or conductor d. These feeler signals can be infed by switch means 58 and the line a to the X-regulator and the servo-amplifier 36x, so that the measuring feeler 42 automatically can be controlled or guided along the tooth flank profile which is being scanned by such measuring feeler. Alternatively, the X-regulator and the servo-amplifier 36x can receive from the computer shown in FIG. 7 reference position signals.

Figure 6:
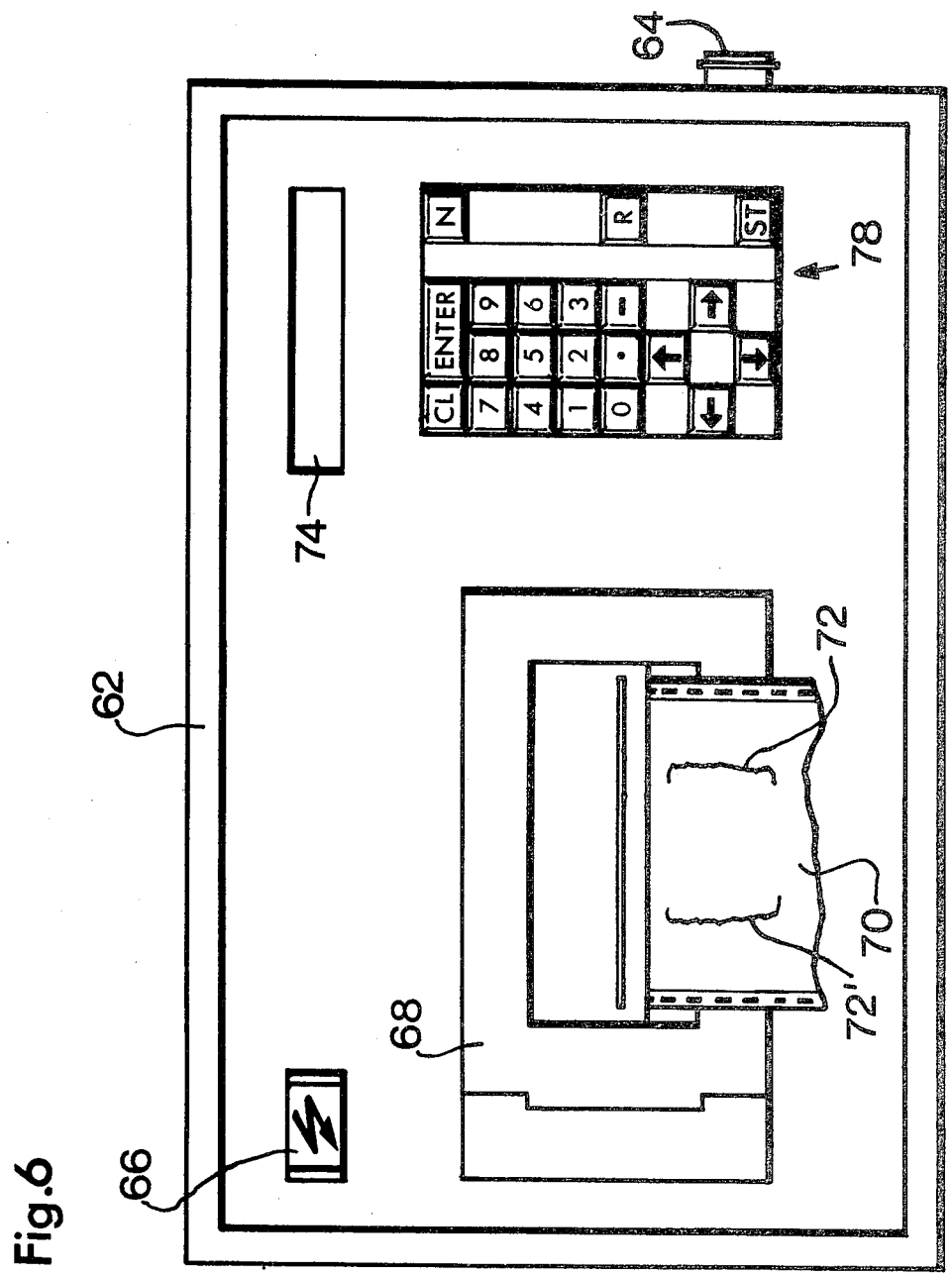
FIG. 6 is a top plan view of a control device at which there can be connected the feeler unit of the arrangement of FIG. 1.

The described lines or conductors a to f as well as an additional line g, emanating from the keyboard 54, are grouped together into a cable and interconnect the feeler unit or device 18 with a control device or control means 62, the exterior of which has been shown in detail in FIG. 6. Belonging to the externally visible components of the control device 62 is a connection 64 for the aforementioned cable, a network switch 66, a recording device 68 having graph paper 70, upon which there can be plotted the profile graphs or diagrams 72 and 72' for, in each case, a right tooth flank and a left tooth flank. Further, there is shown a luminescent display or indicator 74, which indicates the start of a measurement operation, and a keyboard 78. The inscriptions on the keys of the keyboard 78 have the following significance:

| | | |
|---|---|---|
| ENTER | = | Recording key |
| CL | = | Extinguishing or clearing key |
| N | = | Numeric key for designating the measured tooth |
| R | = | Repetition key |
| ST | = | Shut down of the drive of the measuring feeler |
| 0 – 9 | = | Numeric keys |
| Arrow | = | Writing pen and paper positioning in the recording or writing device 68 |
| Dot | = | Magnification factor of the profile graphs 72 and 72' |
| Minus Sign | = | Documentation data input. |

Figure 7:
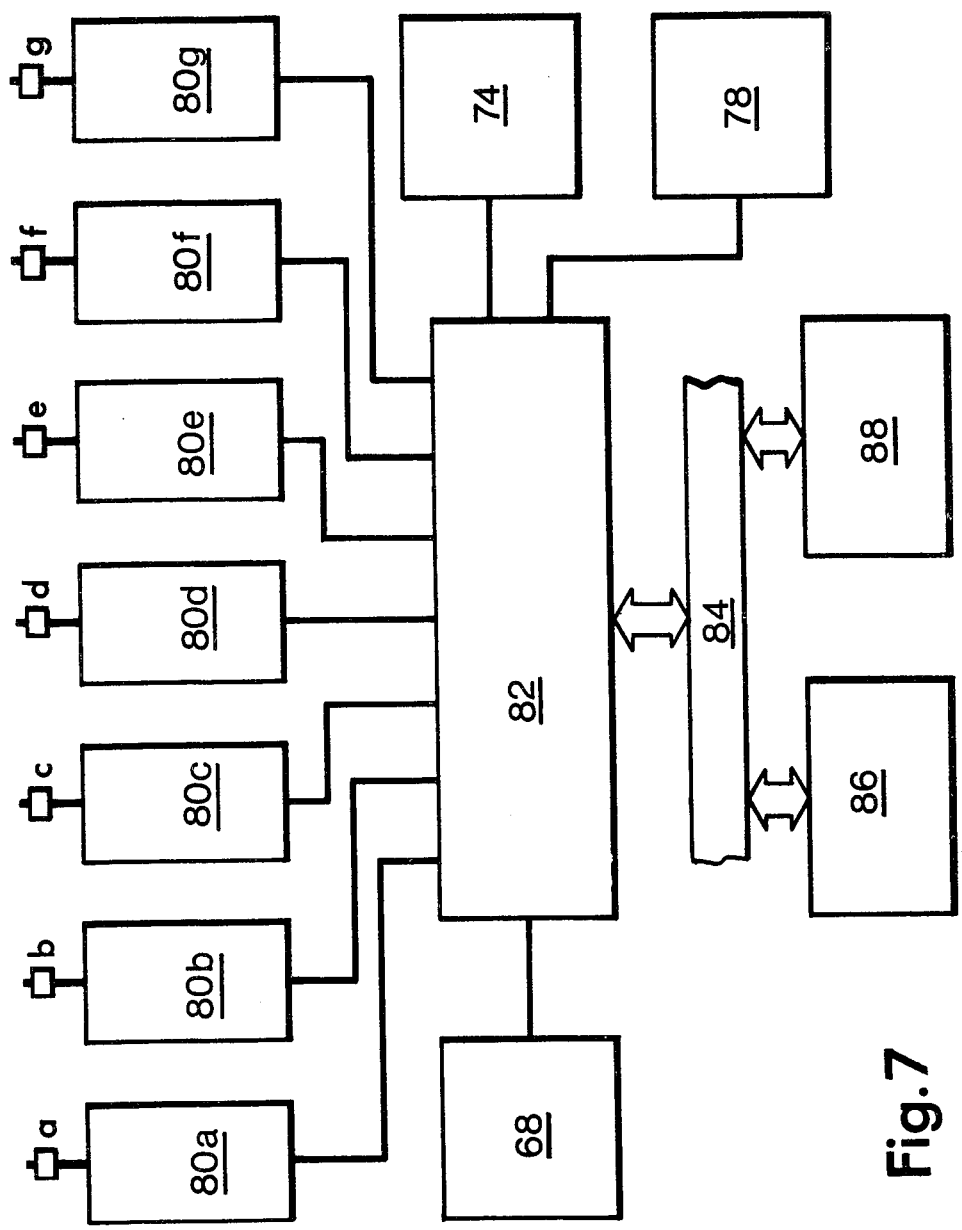
FIG. 7 is a block diagram of the control device.

Now in FIG. 7 there has been shown as a block circuit diagram the circuit arrangement of the control device 62 illustrated externally in the arrangement of FIG. 6. It is to be understood that the lines or conductors a to g coincide with the same referenced lines of FIGS. 1 and 5. Belonging to such circuit arrangement, apart from the components previously described in conjunction with FIG. 6, are electronic units or devices 80a to 80g, the letters of which coincide with those of the related lines a to g. In particular, these electronic units or devices 80a to 80g are constituted by the following components:

A control device 80a for the movements of the slide 28x along the X-axis;

A control device 80b, by means of which the measuring feeler 42 is controlled in the described manner and selectively is advanced towards the right or towards the left for scanning a right tooth flank and there is brought about a pre-biasing towards the right in each case only by a signal of the control device 80b;

A control device 80c for the movement of the slide or carriage 28y along the Y-axis;

A processing or preparation device 80d for the signals delivered by the measuring feeler 42;

A processing or preparation device 80e for the signals delivered by the scanner 40y; this device 80e additionally contains a Y-counter and a Y-comparator or comparison device, by means of which there are counted the signals of the scanner 40y and can be compared with a preadjustable value;

A processing or preparation device 80f containing an X-counter for the signals delivered by the scanner 40x; and A transmission device 80g for the keyed-in operating signals.

The devices or units 80a to 80d contain a respective digital-analogue converter. All of the mentioned devices 80a to 80g, just like the recorder device 68, the luminescent display 74 and the keyboard 78, are connected with an adapter 82 which, in turn, is connected by means of a multiple line or bus 84 with a computer 86 and a memory or storage 88.

The keyboard 54, arranged according to the showing of FIG. 1 at the therein right-hand illustrated contact slide 48, as will be readily evident from the previous description, is connected by means of the line or conductor g and the transmission unit 80g of the control device 62 with its adaptor 82. The inscription of the keys of the keyboard 54 in FIG. 8 have the following significance:

| | | |
|---|---|---|
| TT | = | Readjustment or follow-up of the measuring feeler 42 |
| LF | = | Pre-biasing the measuring feeler 42 towards the right for scanning a left tooth flank |
| F | = | Setting of the end point at the side of the tooth space of the tooth flank region which is to be scanned |
| K | = | Setting of the end point at the side of the tooth tip of the tooth flank region which is to be scanned |
| STOP | = | Shutdown of the drive of the slides 28x and 28y |
| CLR | = | Clearing key for clearing the commands for the automatic resetting of the measuring feeler 42 and the set end points at the side of the tooth base and tooth head |
| ARROW | = | Directional keys for manual travel of the slides or carriages 28x and 28y. |

Figure 9:
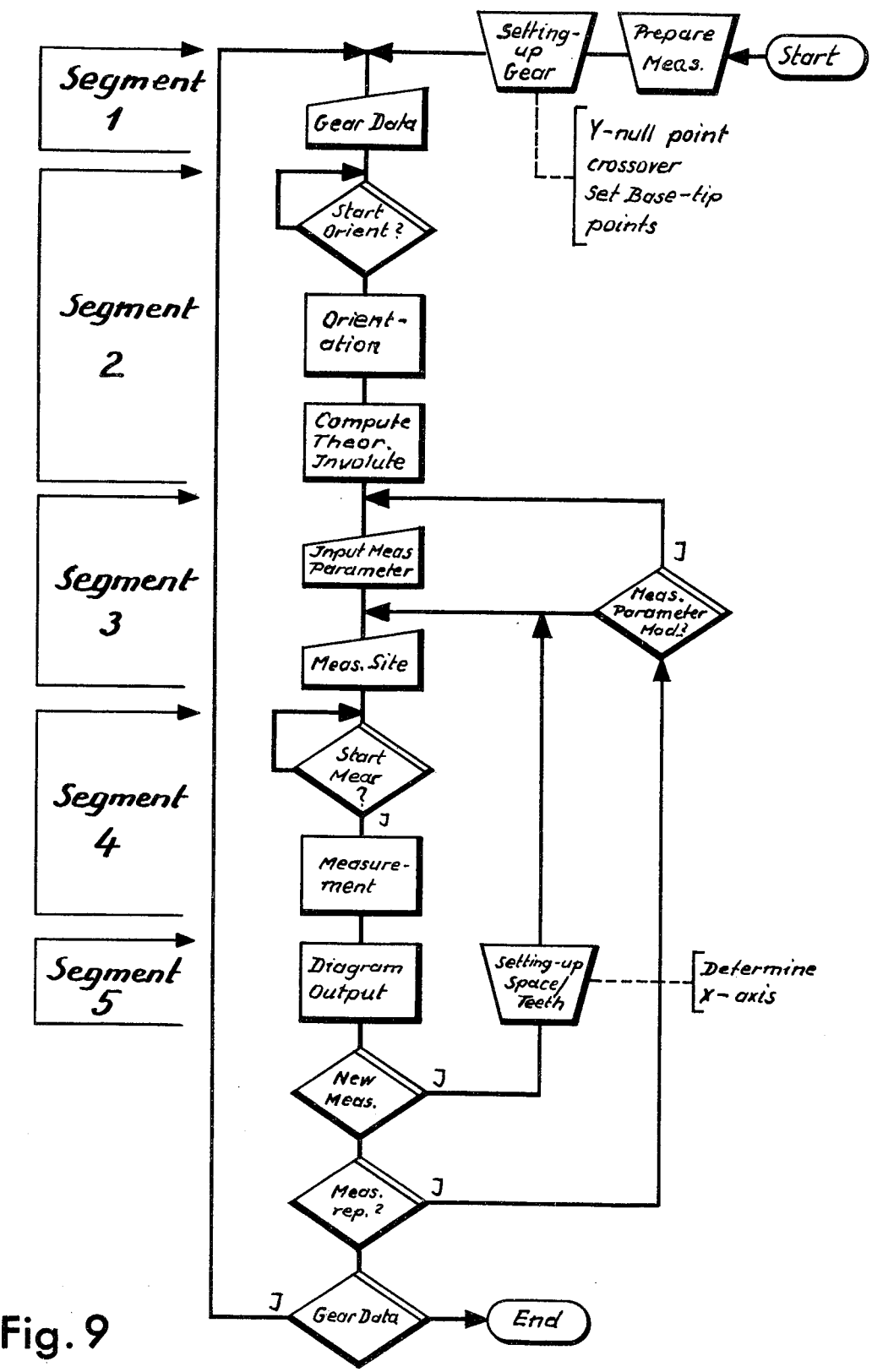
FIG. 9 is a flow diagram of the program course during measurement of a gear.

The flow diagram shown in FIG. 9 illustrates the preparation and course of testing a tooth flank profile. The operation "ORIENTATION", contained in this flow chart or diagram, has been illustrated in FIG. 10 in a separate flow diagram, and specifically for both possible cases, wherein the number KZ of the teeth 12', arranged between the contact elements 50 is an even number or an uneven number. The illustration of the flow diagram is standardized: the different shapes or geometrical configurations of the individual boxes signify the following:

Trapezoid, tapering towards the bottom: preparatory manual activity of the user;

Trapezoid, tapering towards the left: data input by the user;

Rhombus havng double line at the right top: decision of the user which is inputted by key depression or activation;

Rectangle: mathematical or other operation which is controlled by the control device 62; and Simple rhombus: questions which are asked and processed by the control device 62.

According to the showing of FIG. 9 the testing program is divided into a number of segments 1 to 5, within which there can be repeated the program course, without effecting other segments thereof; this has been indicated by arrows at the left margin of the showing of FIG. 9. Moreover only the operation "ORIENTATION" needs further explanation, which will be made predicated upon the showing of FIG. 10.

The first command "travel Y-slide in the orientation position" brings about that the slide 28y assumes a position where the feeler arms or arm members 46 come into alignment with both of the bolt-shaped stops or impact members 52. This position is retained by the slide 28y, whereas by virtue of the command "feeler-pre-bias left flank" the measuring feeler 42 of FIG. 1 is pre-biased towards the right, as if it had to scan a left tooth flank. The command "travel X-slide towards the right", enables the slide or carriage 28x to travel to such an extent towards the right until the right feeler arm 46 impacts against the impact member or stop 52 of the right contact slide 48, and consequently, the measuring feeler 42 connected with the feeler arms 46 is brought, against its pre-bias, into its null position, as if it had scanned a left tooth flank.

The command "switch to feeler- readjustment and hold X-position" results in the preparation unit 80f for the signals transmitted by the scanner 40x being brought into a preparatory state. The command "set X-counter to null" provides the prerequisites that the distance or path through which the slide 28x thereafter travels, during its movement towards the left, will be readable at the X-counter. Before the slide 28x has received the command to travel towards the left, the command "feeler- pre-bias right flank" enables the measuring feeler 12 to assume its left contact or impact position, as if it had to scan a right tooth flank. Thereafter, the slide 28x travels towards the left until the left feeler arm 46 impacts against the stop 52 of the left contact slide 48, and thus, brings the measuring feeler 42 into its null position. The slide 28x is held in the thus attained position with further unaltered position of the slide 28y, until the state of the X-counter has been read-off by the preparatory unit 80f and has been transferred into the storage or memory 88.

Hence, there has been determined the distance or spacing S between both of the contact elements 50, since it differs from the path through which there has moved the slide 28x, possibly by a constant value, which is dependent upon the configuration of the contact slides 48 and the arrangement and length of the stops 52 as well as the feeler arms 46 and is stored as machine constant.

Figure 10:
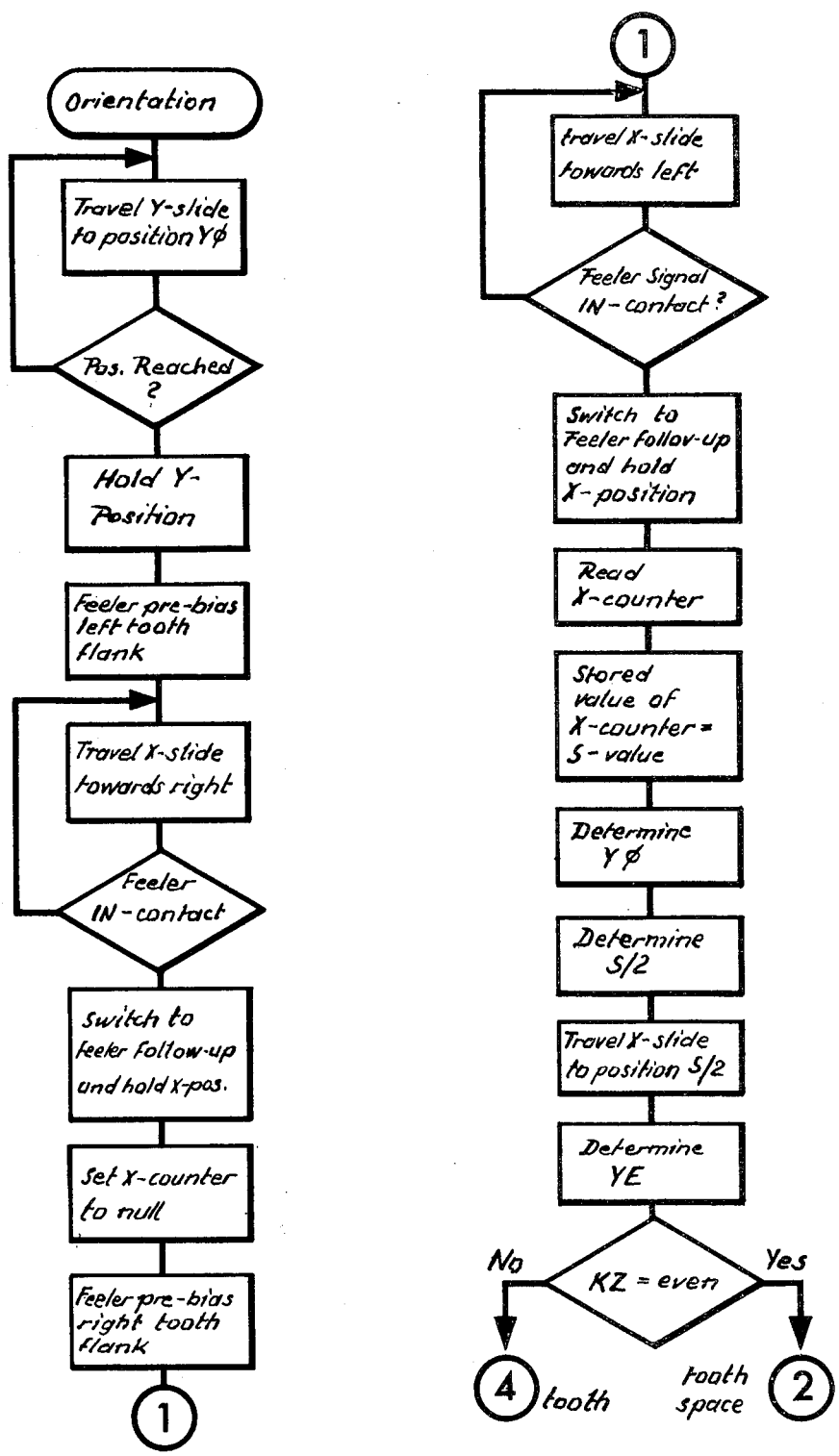
FIG. 10 is a flow diagram of the program course during the orientation of the inventive testing machine within the framework of the program shown in FIG. 9.
Figure 11:
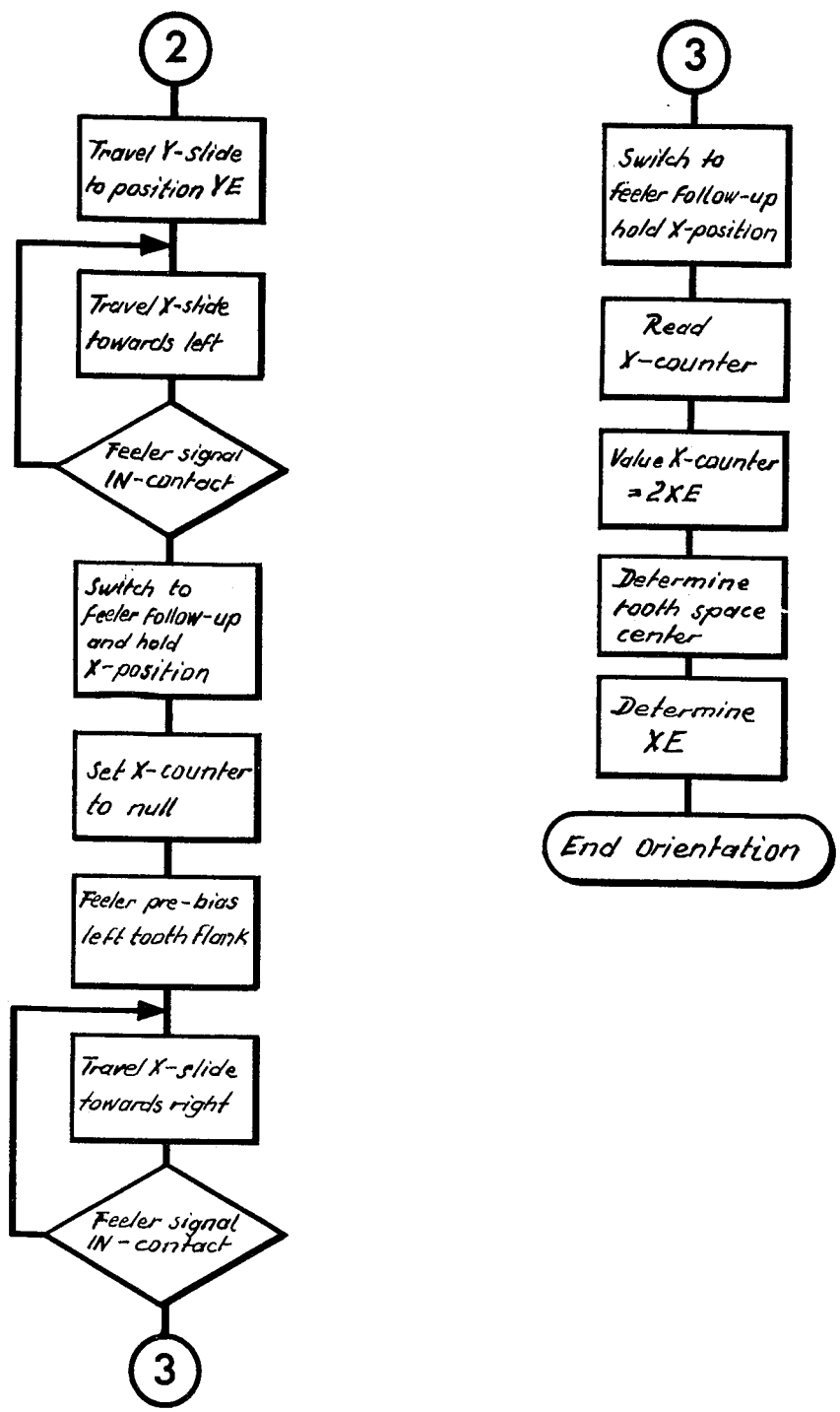
FIG. 11 is a continuation of the flow diagram of FIG. 10.
Figure 12:
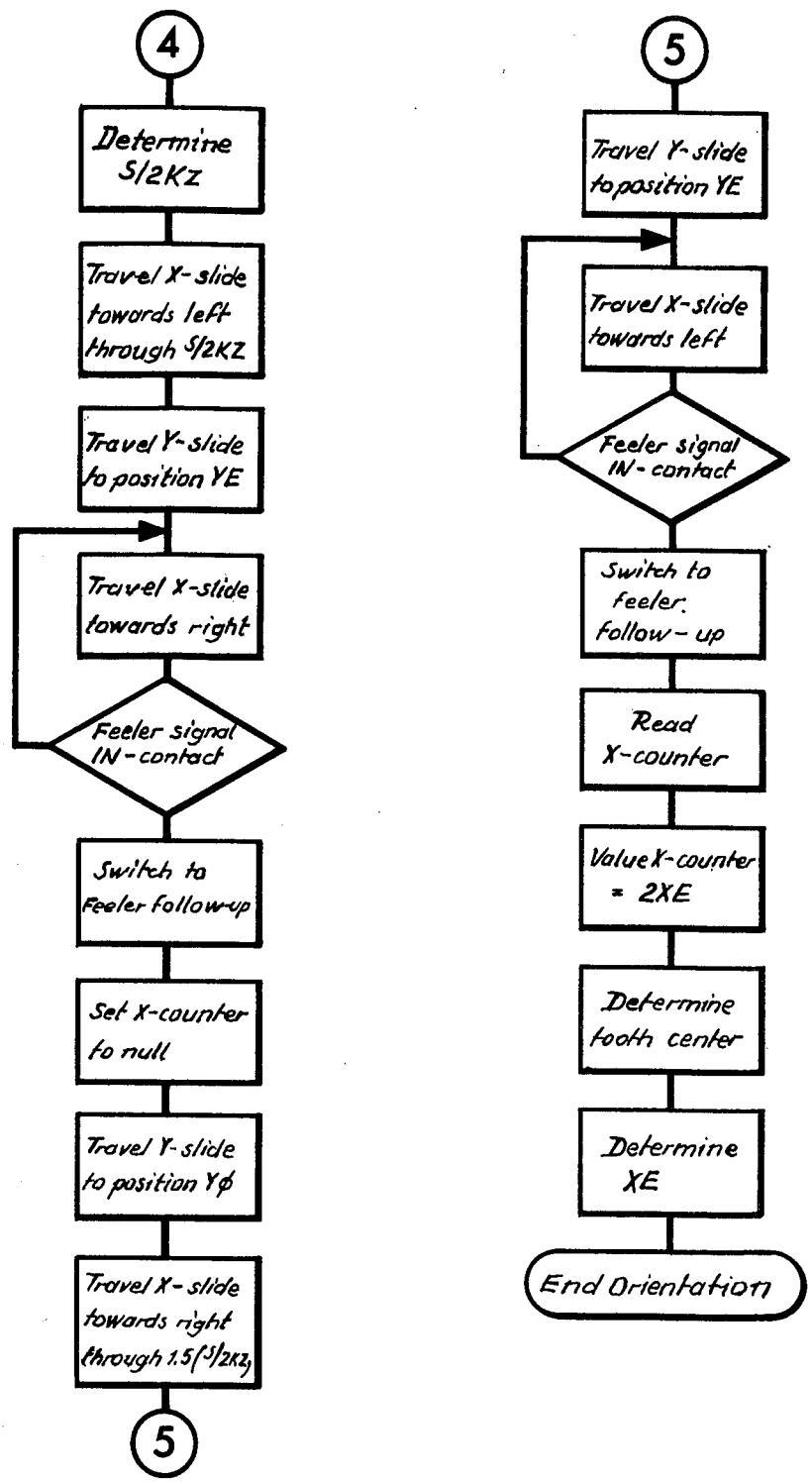
FIG. 12 is a further continuation of the flow chart or diagram of FIG. 10.

The further course of the orientation program is readily understandable based upon the flow diagrams of FIGS. 10, 11 and 12, as well as the introductory portion of this description.

While there are shown and described present preferred embodiments of the invention, it is to be distinctly understood that the invention is not limited thereto, but may be otherwise variously embodied and practiced within the scope of the following claims. Accordingly,

What we claim is:

1. In a method of testing a tooth flank profile of large diameter gears having an axis, comprising the steps of:
providing a testing apparatus equipped with two contact elements and a measuring feeler, which is movable along an X-axis essentially parallel to a connection line between both of the contact elements and a Y-axis extending transversely with respect to the X-axis;
placing the contact elements into a respective tooth space of a gear which is to be measured;
bringing the testing apparatus into a position where both axes are located in a plane essentially normal to the axis of the gear, in order to thereby define the origin of a X-Y-coordinate system formed by both axes;
thereafter moving the measuring feeler along at least one of the tooth flanks and comparing the thus measured coordinates with reference values, the improvement which comprises;
measuring the spacing (S) between both contact elements; and determining the spacing (YO) of the coordinate origin from the gear axis according to the equation:

$$YO = \frac{S}{2} \cdot ctg\,(180° \cdot \frac{KZ}{Z}) + C$$

wherein:
C designates a constant of the testing apparatus;
KZ designates the number of teeth between both of the contact elements; and
Z designates the total number of teeth of the gear.

2. The method as defined in claim 1, further including the steps of:
placing the measuring feeler, for measuring the spacing of both contact elements from one another, into a reference position determined by the position of one of the contact elements;
activating at that location an X-scanner which scans the movement of the measuring feeler along the X-axis;
then bringing the measuring feeler into a reference position determined by the position of the other contact element; and
determining at that location the distance through which the X-scanner has moved.

3. The method as defined in claim 2, further including the steps of:
receiving between both of the contact elements an uneven number of gear teeth;
applying the measuring feeler from a retracted position, which it assumes during measuring of the spacing between both of the contact elements, directly at one of the tooth flanks of an intermediate tooth between both of the contact elements;
determining the related S-Y-values;
then moving the measuring feeler about the intermediate tooth and applying it at a location having the same Y-value at its other tooth flank;
forming the mean value between both X-values; and
correspondingly correcting the position of the Y-axis.

4. The method as defined in claim 2, further including the steps of:
receiving between both of the contact elements an even number of gear teeth;
applying the measuring feeler from a retracted position, which it assumes during measuring of the spacing between both of the contact elements, directly at one of the teeth flanks to both sides of the intermediate tooth gap between both of the contact elements;
determining the related X-and-Y coordinates;
then applying the measuring feeler, without changing its Y-value, to the other tooth flank bounding the intermediate tooth gap;
forming the mean value between both X-values; and
correspondingly correcting the position of the Y-axis.

5. The method as defined in claim 1, further including the steps of:
- receiving between both of the contact elements an uneven number of gear teeth;
- applying the measuring feeler from a retracted position, which it assumes during measuring of the spacing between both of the contact elements, directly at one of the tooth flanks of an intermediate tooth between both of the contact elements;
- determining the related X-Y-values;
- then moving the measuring feeler about the intermediate tooth and applying it at a location having the same Y-value at its other tooth flank; forming the mean value between both X-values; and correspondingly correcting the position of the Y-axis.

6. The method as defined in claim 1, further including the steps of:
- receiving between both of the contact elements an even number of gear teeth;
- applying the measuring feeler from a retracted position, which is assumes during measuring of the spacing between both of the contact elements, directly at one of the teeth flanks to both sides of the intermediate tooth gap between both of the contact elements;
- determining the related X-and-Y-coordinates;
- then applying the measuring feeler, without changing its Y-value, to the other tooth flank bounding the intermediate tooth gap;
- forming the mean value between both X-values; and correspondingly correcting the position of the Y-axis.

7. A testing apparatus for testing the tooth flank profile of gears of large diameter and having a gear axis, comprising:
- two contact slide means;
- guide means extending tangentially with respect to the gear to be testedd;
- said two contact slide means being movable in relation to one another along said guide means;
- each of said contact slide means supporting a respective contact element adapted to engage into a tooth space;
- a cross-slide arrangement for supporting a measuring feeler;
- a measuring feeler supported by said cross-slide arrangement;
- said cross-slide arrangement comprising an X-slide and a Y-slide;
- X-guide means extending tangentially with respect to the gear and along which there is displaceable said X-slide;
- Y-guide means along which there is displaceable said Y-slide; and
- said X-guide means extending over the entire path through which the X-slide has to move in order to enable the measuring feeler to scan in succession the positions of both contact guide means.

8. The testing apparatus as defined in claim 7, wherein:
- said X-guide means defines a common X-guide upon which there are displaceable both of the contact slide means and therebetween the X-slide.

9. The testing apparatus as defined in claim 8, wherein:
- each contact slide means is provided at a side thereof which confronts the other contact slide means with stop means;
- said measuring feeler being connected with two feeler arms protruding therefrom in the X-direction towards both sides; and
- said feeler arms, with a predetermined position of the Y-slide, being capable of being brought into contact with both of the stop means by displacing the X-slide.

10. The testing apparatus as defined in claim 7, wherein:
- each contact slide means is provided at a side thereof which confronts the other contact slide means with stop means;
- said measuring feeler being connected with two feeler arms protruding therefrom in the X-direction towards both sides; and
- said feeler arms, with a predetermined position of the Y-slide, being capable of being brought into contact with both of the stop means by displacing the X-slide.

11. The testing apparatus as defined in claim 7, further including:
- a respective electronically scannable scale arranged at the X-guide means and the Y-guide means;
- electronic counter means;
- said X-slide and said Y-slide supporting a respective related X-scanner and Y-scanner; and
- said X-scanner and said Y-scanner being connectable with said electronic counter means.

* * * * *